May 16, 1967 P. K. SHRECK ETAL 3,319,357
EDUCATIONAL DEVICE
Filed Feb. 23, 1965 4 Sheets-Sheet 1
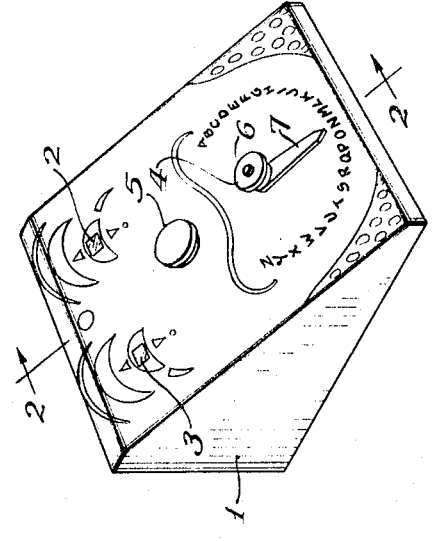
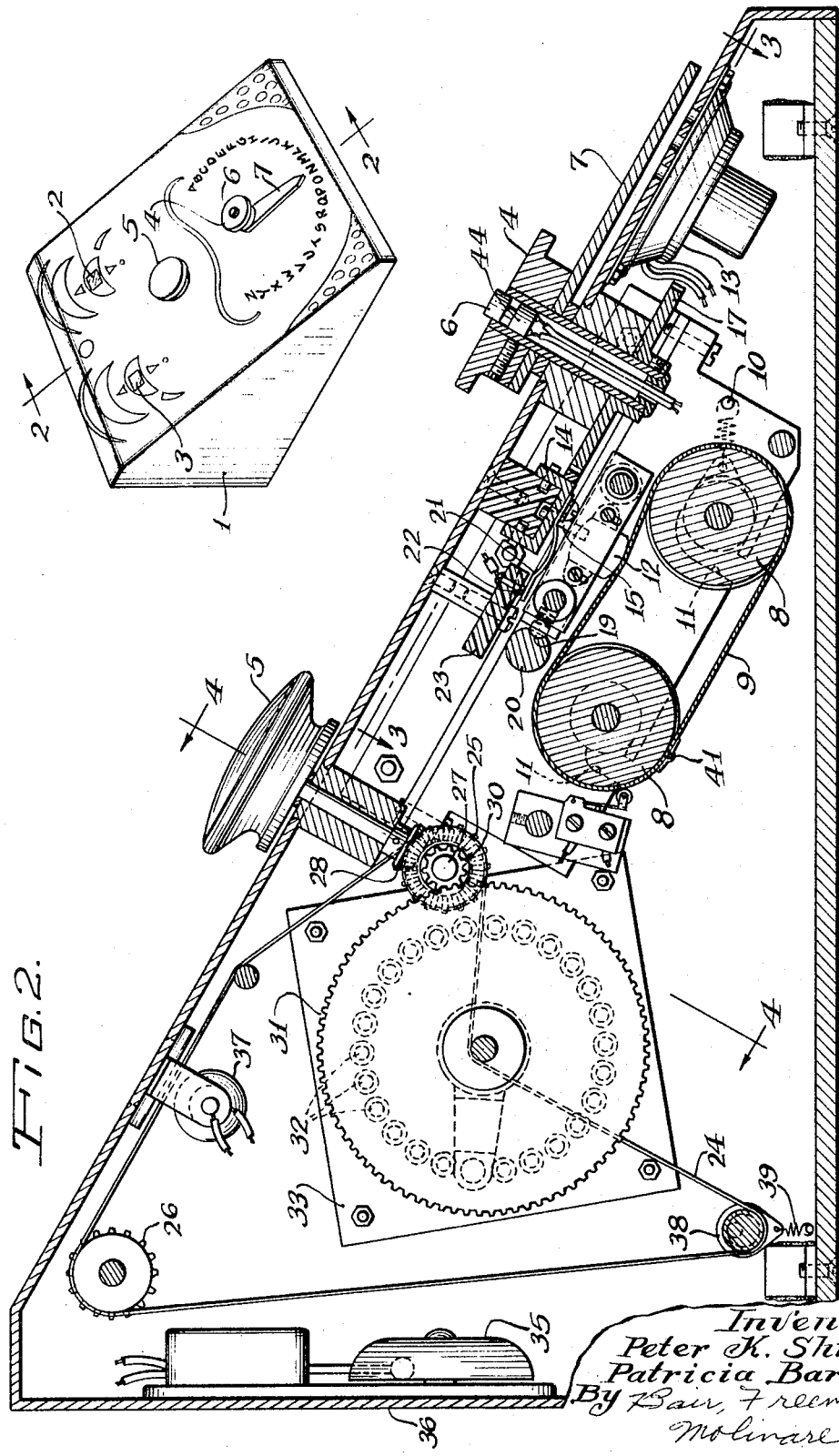
Inventors:
Peter K. Shreck
Patricia Barnett
By Bair, Freeman &
Molinare Attys.

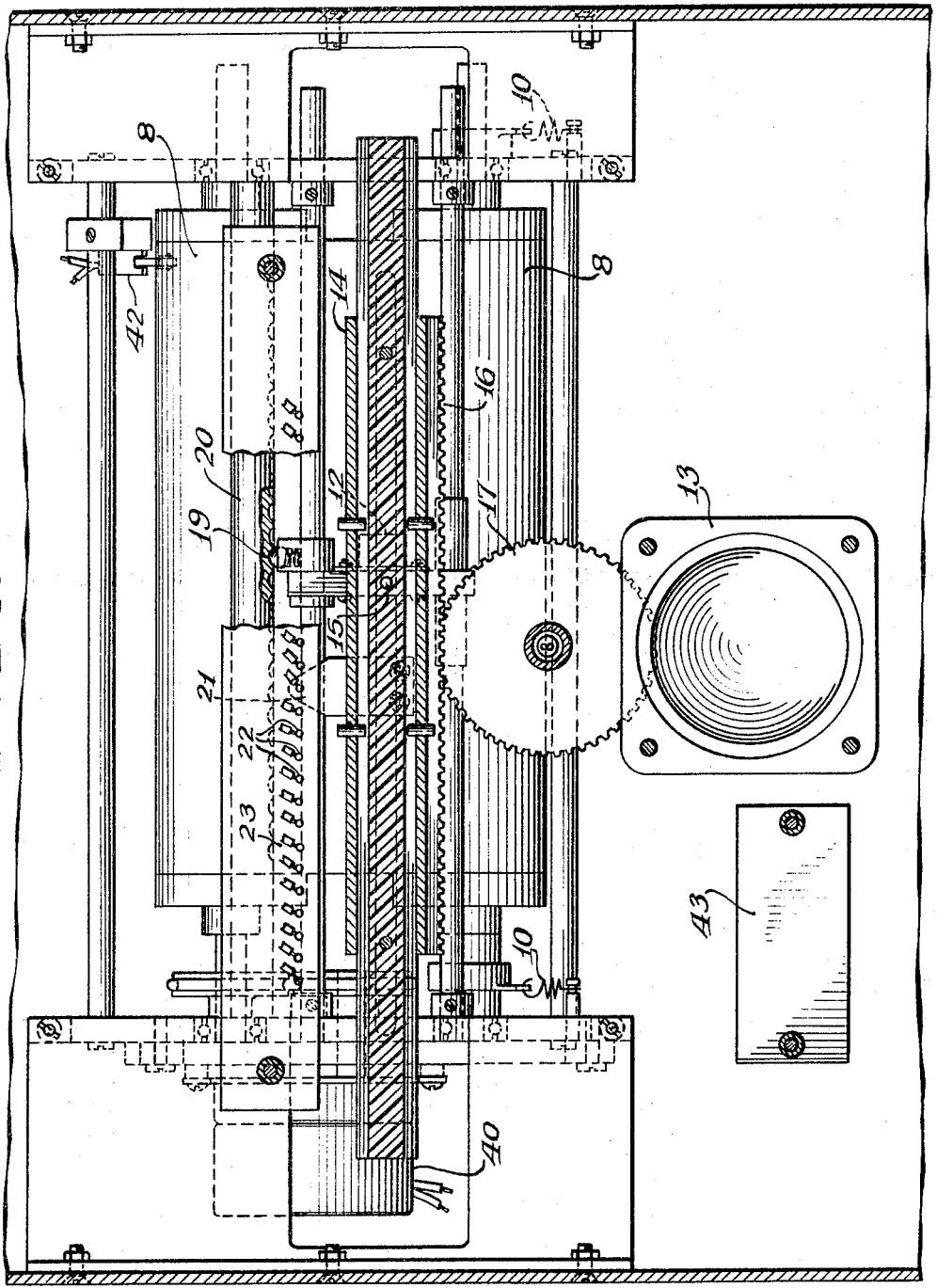

May 16, 1967  P. K. SHRECK ETAL  3,319,357
EDUCATIONAL DEVICE
Filed Feb. 23, 1965  4 Sheets-Sheet 3

Inventors:
Peter K. Shreck
Patricia Barnett
By Bair, Freeman &
Molinare Attys.

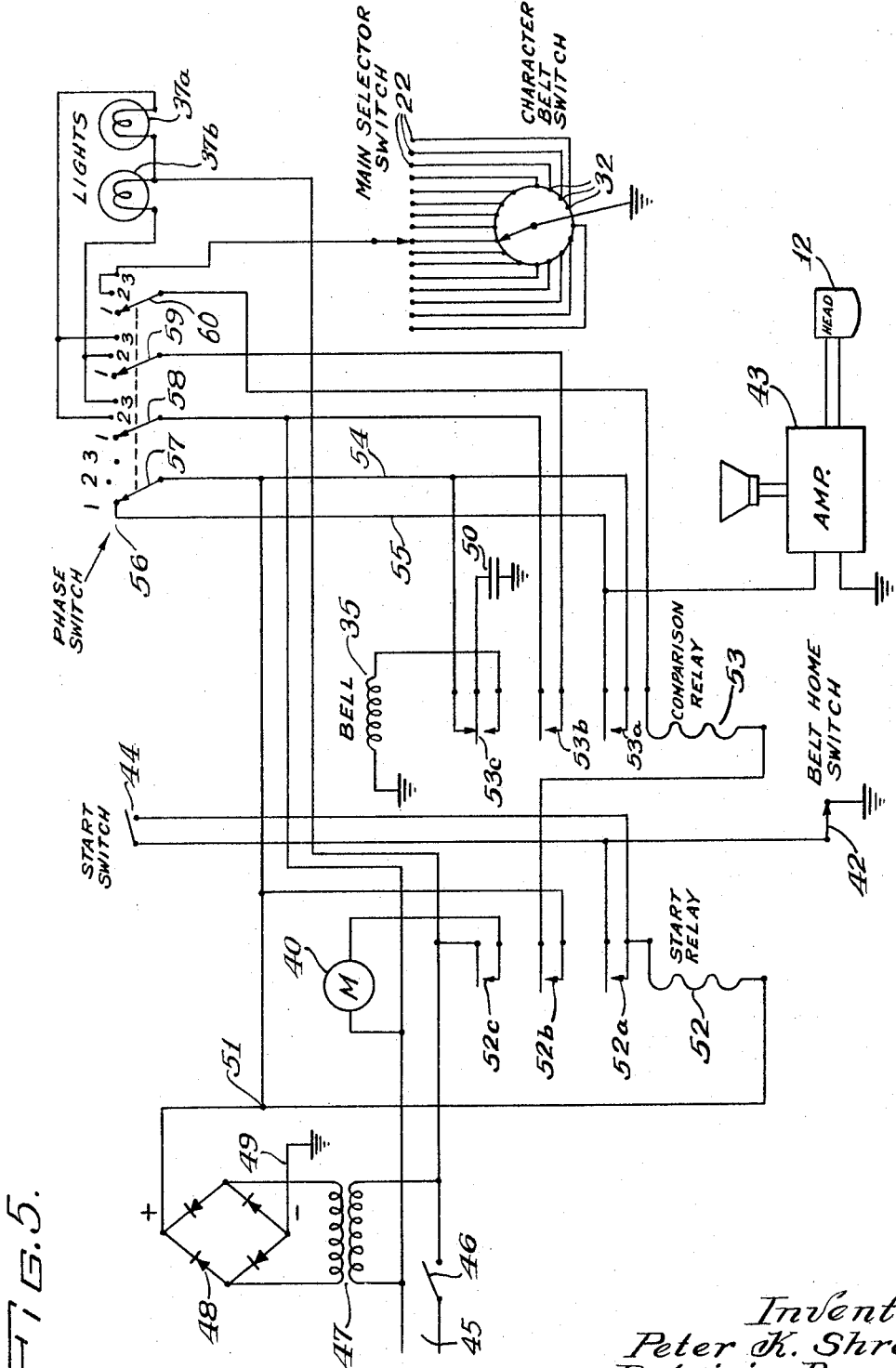

though the apparatus described is simple in construction and operation, it constitutes a versatile and durable device which can be readily used by children or adults and is capable of a wide range of educational uses.

United States Patent Office 3,319,357
Patented May 16, 1967

3,319,357
EDUCATIONAL DEVICE
Peter K. Shreck, 744 W. Dempster, Mount Prospect, Ill. 60056, and Patricia Barnett, Albuquerque, N. Mex.; said Barnett assignor to said Shreck
Filed Feb. 23, 1965, Ser. No. 434,602
6 Claims. (Cl. 35—35)

This invention relates to educational devices and in particular to a device for selectively reproducing sounds corresponding to or related to selected characters or symbols, and in addition for selectively producing sounds in conjunction with matching two or more preselected characters or symbols.

In teaching pronunciation or speech, it is desirable to provide a means by which there can be reproduced sounds corresponding to characters or symbols. It is also desirable to provide means by which sound can be reproduced concomitantly with matching two or more characters or symbols. For example, in teaching transmission of the alphabet or words or phrases either in the student's native language or a foreign language, such a device should permit selection of any character or symbol in the nature of a letter, word or phrase and should concomitantly produce the sound thereof. In addition the device should permit matching related characters, such as upper and lower case letters of the alphabet, in conjunction with audibly producing the sound thereof. Alternatively, the device should produce sound corresponding to pictures or similar representations such as the sound made by various animals, birds, or the like. Such pictures, as well as letters, words, phrases, and the like, are here generically referred to as "characters."

Various devices have heretofore been proposed for this general purpose, but all are subject to deficiencies of one sort or another. Most of the prior art devices are so complicated in construction or in the operation necessary to select the desired character, or in both, that they are impractical. Furthermore, in many cases the scope of use of the device is limited in that the audible recordings are difficult or impossible to change or incapable of producing audible sounds of sufficient duration or have any but very restricted utility.

It is accordingly an object of the present invention to provide an educational device which produces sounds corresponding to selected characters which provides a wide range of sound recording in each group, in which the sound recording is easily changed, in which selection of desired characters is made easily and quickly and in which individual sound recordings are of sufficient duration to satisfy a wide range of subjects.

Another object is to provide an educational device in which two or more characters or symbols may be displayed and compared visually while concomitantly producing a sound related to the character or symbols, The above and other objects of the invention will be more readily apparent from the following descriptions when read in connection with the accompanying drawing, in which:

FIG. 1 is a perspective view of a device embodying the invention;

FIG. 2 is a side view, partially in section, along line 2—2 of FIG. 1;

FIG. 3 is a partial top view along line 3—3 of FIG. 2;

FIG. 5 is a circuit diagram.

Figure 4:
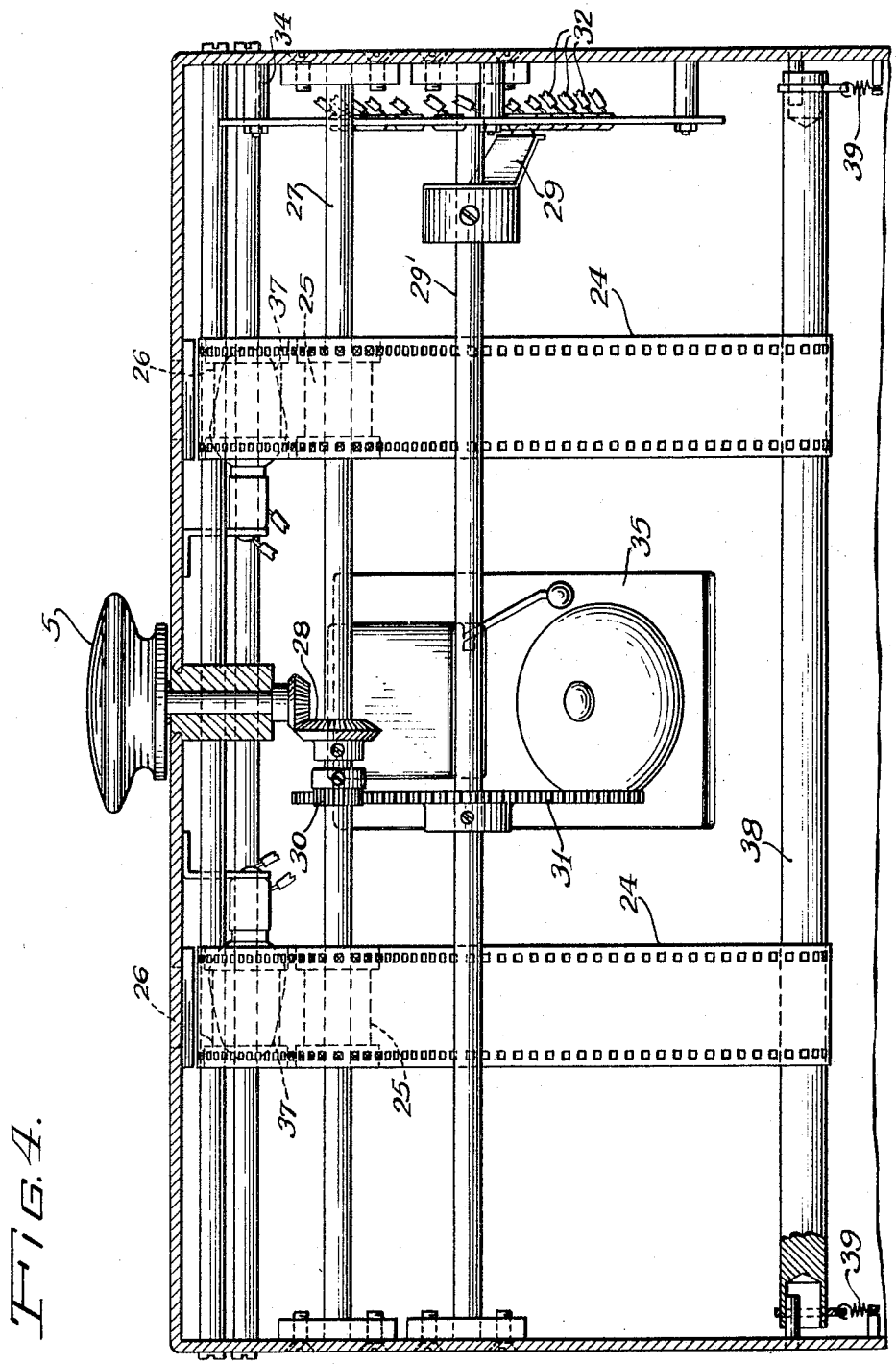
FIG. 4 is a view partially in section along line 4—4 of FIG. 2.

The complete apparatus, as shown in FIG. 1, comprises a housing 1 the upper face of which is provided with apertures 2 and 3 and is marked with the alphabet as educational indicia on its lower portion. Knobs 4 and 5, hereinafter described in detail, along with apertures 2 and 3 and other marking on the upper face of housing 1 create a face-like impression of a clown. Alternatively, other educational indicia may be employed such as pictures of animals or simple words and the upper face can be decorated in various ways suitable for the use being made of the device.

For purposes of description and explanation, the device can be considered as consisting of two sections, hereinafter described as a sound reproducing section and a visual comparing section. It will be understood that such sections are not mutually independent but operate in conjunction through electrical circuitry.

*Sound reproducing section*

The sound reproducing section as best shown in FIGS. 2 and 3 consist of two rotatable drums 8 which carry magnetic tape 9. On the tape is recorded circumferentially tracks of sounds corresponding to the visual indicia on the lower portion of the upper face of housing 1. Drums 8 are spring-urged at 10 to keep tape 9 taut during operation and removable through slots 11 for substituting tapes or for cleaning or repair. Magnetic pick-up head 12 contacts tape 9 on its upper surface as shown in FIG. 2. Pick-up head 12 is connected electrically to amplifier 43 (shown schematically in FIG. 5) and is attached by pin 15 to U-shaped carriage 14. Carriage 14 carries a rack 16 (FIG. 3) for engagement with gear wheel 17 and is movable transversely above tape 9 by manually rotating knob 4. The knob 4 may carry an operating button 6 for a start switch 44 whose function is described more fully hereinafter and may turn a pointer 7 movable over the indicia on the face of the housing. Forward of pick-up head 12 is a spring-urged ball 19, best seen in FIG. 3, which communicates with indents in fixed bar 20. The ball-indent structure permits accurate transverse positioning of carriage 14 so pick-up head 12 contacts tape 9 at preselected positions to register accurately with the sound tracks thereon. Attached to carriage 14 is plate 21 which makes electrical contact at its terminus with points 22 on an insulating strip 23. The function of points 22 will be hereinafter discussed. Drums 8 are rotatable by motor 40 (FIG. 3). Tape 9 is provided with button 41 which trips belt home switch 42 to turn off motor 40 after one revolution of tape 9.

*Visual comparing section*

The visual comparing section is best seen in FIGS. 2 and 4. Indicia to be viewed through apertures 2 and 3 (FIG. 1) are carried on endless belts 24 which may comprise conventional photographic negatives or simply translucent photographic positives or draawings. Belts 24 are rotatable past apertures 2 and 3 by means of sprocket wheels 25 and 26 (FIG. 2). Wheels 25 and 26 are fixedly supported by rod 27 which rotates by means of bevel gear 28 when knob 5 is turned. Rod 38, around which belts 24 rotate, is spring-urged at either end by springs 39 to keep the belts 24 taut.

Rotation of knob 5 also controls movement of electro switch 29 the arm of which rotates with shaft 29' through gears 28, 30, and 31. Contact points 32, fastened to plate 33 which is secured by studs 34 to side of housing 1, are selectively engaged by contact arm 29 as shaft 29' is turned. Thus it will be seen that as knob 5 is turned, belts 24 rotate past apertures 2 and 3 and selector switch 29 rotates with rod 29' and contacts sequentially points 32 (FIG. 2). Bell 35 is secured to end wall 36 of housing 1 and is wired as shown diagrammatically in FIG. 5.

Lights 37 (FIGS. 2 and 5) are conventional incandescent bulbs and are located with respect to belts 24 and apertures 2 and 3 so that when lighted, indicia on belts 24 are visible externally of the device through apertures 2 and 3.

The control circuit

The apparatus is powered from a conventional A.C. power source indicated at 45 connected through a main on-and-off switch 46 to the control circuit of the apparatus. A transformer 47 connected across the power circuit supplies a rectifier 48 to provide relatively low voltage D.C. current for operation of the various relays and the amplifier as described hereinafter. One side of the rectifier is connected to ground at 49 and the opposite side is connected to a terminal point 51 to which various parts of the control circuit are in turn connected.

A start relay 52 is connected at one side at the point 51 and through a start switch 44 and a belt home switch 42 to ground. The relay 52 operates three sets of contacts, 52a, 52b, and 52c, which are normally open and which are closed when the relay 52 is energized. The contacts 52a complete a holding circuit by-passing the start switch 44 so that the start relay will remain energized until the switch 42 is opened. The contacts 52c complete a circuit to the motor 40 for driving the belt. The contacts 52b complete a circuit to a comparison relay 53 which when energized closes normally open contacts 53a and 53b and operates a double pole switch 53c. The double pole switch 53c normally completes a circuit from a line 54 to ground and when moved by energizing of the relay 53 completes a circuit through the bell 35 to ground so that the bell will be energized. The switch contacts 53a when closed complete a circuit from a line 54 to a line 55 which is connected through the amplifier 43 to ground to energize the amplifier. Preferably a capacitor at 50 is provided in the connection in the line 54 through the contacts 53c to ground as shown.

A three position gang phase switch indicated generally at 56 is provided with four wipers 57, 58, 59, and 60 which are mechanically interconnected for simultaneous movement for three different positions in which they make contact respectively with the contacts marked 1, 2, and 3 on each section of the gang switch. The switch 56 may be mounted in any convenient location in the housing and may be provided with a manual operating knob, not shown. The lines 54 and 55 are connected through the switch 57 in the first position as shown in FIG. 5 while each of the other switches 58, 59, 60 are in a dead condition in the first position. In the second and third positions the switch 57 is open. In the second position switch 58 completes a circuit from one side of the power source through the signal light 37a to the other side of the power source. The switch 59 in the second position completes a circuit through the signal light 37b when the switch 53b is closed. In the second position of the switch 60, it completes a circuit through switch contacts 52b and relay 53 to the main selector switch 22 and through the character belt switch 32 to ground. In the third position of the gang switch, the switch 58 completes a circuit from one side of the power source through the signal light 37b to the other side of the power source. The switch 59 completes a circuit from the switch contacts 53b hrough the signal light 37a to ground. The switch 60 in position 3 completes the same circuit as in position 2 as described above.

Operation

In the operation of the apparatus three different modes of operation are possible which will be described primarily with reference to FIGS. 2 and 5. In mode 1 the phase switch 56 is in the first position so that when the start switch is closed the start relay 52 will be energized to close the contacts 52a, 52b, and 52c. Closing the contacts 52c will start the motor 40 to drive the belt 9. At the same time the amplifier is energized through switch 57 in its first position so that the sound on the selected portion of the sound tracks on the belt 9 will be produced.

Thus the sound of any character for which the knob 4 is adjusted will be sounded. Under mode 1 this is the only operation that will occur and it will produce the sound of any character which has been selected by the operator through adjustment of the knob 4.

In mode 2 of operation, the phase is adjusted to the second position. At this time when the start switch is closed, the relay 52 will be energized to start motor 40 and to drive the belt 9. At the same time the signal light 37a will be energized through the switch 58 so that the character on the film strip 24 lying opposite to the opening 2 or 3 behind which the light 37a is mounted will be illuminated. In this mode of operation however, unless the main selector switch and the character belt switch are in corresponding positions, nothing else will occur. It will be seen that in the second position of the phase switch the amplifier is de-energized until the switch contacts 53a are closed so that no sound will be produced until these contacts are closed.

If, however, the main selector and the character belt switch have been moved to corresponding positions so that a circuit through these two switches from the second contact of switch 60 will be complete from ground, the relay 53 will be energized through the switch contacts 52b. Energizing of the relay 53 will close the contacts 53a to energize the amplifier so that the sound of the selected character will be produced as the pointer is driven. Simultaneous closing of the relay contacts 53b will complete a circuit from one side of the power source through the second contact of the switch 59 to energize the light 37b whereby the character appearing on the other film strip 24 will be illuminated. Closing of the contacts 53c will energize the bell 35 causing it to sound. The operator is therefore immediately informed that he has correctly matched the charatcer appearing through one of the openings 2 or 3 with the character designated with the pointer 7 which is turned by the knob 4.

The phase switch is moved to its third position at the time the light 37b is energized from one side of the power source through the third contact of switch 58. If the main selector switch and character belt switch are in corresopnding positions, the relay 53 will be energized through the circuit described above to energize the amplifier and the bell and to cause the light 37a to be energized through switch 53b and the third contact of switch 59.

In a technical use of the apparatus the pointer 7 might designate letters of the alphabet as shown in FIG. 1 and the film strips 24 might carry respectively upper and lower case letters corresponding to the letters designated by the pointer 7. The device can thus be used to teach matching of the both upper and lower case characters and to indicate through illumination of the second signal light 37a or 37b and through sound of the bell when a correct match has been achieved. In each of the modes of operation as described above, it will be noted that the sound tape 9 will be driven through a complete cycle until the projection 41 thereon engages and opens the belt home switch 42. Opening of this switch will de-energize the start relay 52 and will leave the apparatus in a position for an additional operation.

It will further be apparent, characters and indicia other than the alphabet can be utilized to make the device adaptable to a wide variety of educational uses. For example, the indicia on the face of the device, indicated by the pointer 7, could be pictures of animals with one of the belts carrying corresponding pictures and the second belt displaying the name of the animal while the sound track can carry a sound of the animal's name or alternatively the sound produced by the animal. In a similar manner words or character in a language foreign to the native language of the user can be employed.

While one embodiment of the invention has been shown and described herein, it will be understood that it is illustrative only and not to be taken as definitive of the

What is claimed is:

1. An educational device comprising means providing a plurality of indicia, adjustable means for selectively indicating portions of said indicia, sound reproduction means, means operated by adjustment of the adjustable means to adjust the sound reproduction means to produce sounds corresponding to the selected indicia, second adjustable means bearing indicia adapted for selective viewing, means to adjust the second adjustable means independently of the first named adjustable means, and means operated when the two adjustable means are in corresponding positions to energize the sound reproduction means and to prevent operation of the second reproduction means otherwise.

2. An educational device comprising means providing a plurality of indicia, adjustable means for selectively indicating portions of said indicia, sound reproduction means, means operated by adjustment of the adjustable means to adjust the sound reproduction means to produce sounds corresponding to the selected indicia, second adjustable means including endless belts bearing indicia adapted for selective viewing, means to adjust the second adjustable means independently of the first named adjustable means, and means operated when the two adjustable means are in corresponding positions to energize the sound reproduction means and to prevent operation of the sound reproduction means otherwise.

3. An educational device comprising means providing a plurality of indicia, adjustable means for selectively indicating portions of said indicia, sound reproduction means, means operated by adjustment of the adjustable means to adjust the sound reproduction means to produce sounds corresponding to the selected indicia, second adjustable means including endless belts bearing indicia adapted for selective viewing, means to adjust the second adjustable means independently of the first named adjustable means, illuminating means adapted to illuminate portions of said belts, and means operated when the two adjustable means are in corresponding positions to energize the sound reproduction means and to prevent operation of the sound reproduction means otherwise.

4. Device of claim 3 further comprising a bell adapted to operate when the two adjustable means are in corresponding positions to energize the sound reproduction means.

5. Device of claim 4 wherein the illuminating means is a plurality of lamps adapted to illuminate conjointly with operation of the bell.

6. Device of claim 3 wherein the sound reproduction means comprises a magnetic tape and pick-up head.

References Cited by the Examiner

UNITED STATES PATENTS

| 2,498,578 | 2/1950 | Reinnagel | 35—35.3 |
| 2,650,097 | 8/1953 | Erdos | 35—35.3 X |
| 3,020,360 | 2/1962 | Gratian et al. | 35—35.3 X |
| 3,136,072 | 6/1964 | Ross | 35—35.3 X |

EUGENE R. CAPOZIO, *Primary Examiner.*

W. GRIEB, *Assistant Examiner.*